(12) United States Patent
Minemura

(10) Patent No.: US 10,787,170 B2
(45) Date of Patent: Sep. 29, 2020

(54) VEHICLE CONTROL METHOD AND APPARATUS

(71) Applicant: DENSO CORPORATION, Kariya, Aichi-pref. (JP)

(72) Inventor: Akitoshi Minemura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 229 days.

(21) Appl. No.: 15/768,284

(22) PCT Filed: Oct. 12, 2016

(86) PCT No.: PCT/JP2016/080206
§ 371 (c)(1),
(2) Date: Apr. 13, 2018

(87) PCT Pub. No.: WO2017/065158
PCT Pub. Date: Apr. 20, 2017

(65) Prior Publication Data
US 2018/0312163 A1    Nov. 1, 2018

(30) Foreign Application Priority Data

Oct. 14, 2015 (JP) .................................. 2015-203113

(51) Int. Cl.
B60W 30/095 (2012.01)
B60T 7/12 (2006.01)
(Continued)

(52) U.S. Cl.
CPC .......... B60W 30/0956 (2013.01); B60T 7/12 (2013.01); B60T 7/22 (2013.01); B60W 30/085 (2013.01);
(Continued)

(58) Field of Classification Search
None
See application file for complete search history.

(56) References Cited

U.S. PATENT DOCUMENTS 5,314,037 A * 5/1994 Shaw ................... B60R 16/0231
                                                                  180/169
5,529,138 A * 6/1996 Shaw ................... B60R 16/0231
                                                                  180/169
(Continued)

FOREIGN PATENT DOCUMENTS

JP  2007-087335 A   4/2007
JP  2010-208583 A   9/2010
(Continued)

*Primary Examiner* — Richard M Camby
(74) *Attorney, Agent, or Firm* — Maschoff Brennan

(57) ABSTRACT

A vehicle control apparatus includes a timing setter that sets an activation timing indicative of whether to activate the safety device based on a comparison between the activation timing and a time to collision, and a determination zone setter setting determination zones located diagonally ahead of the own vehicle in the travelling direction and separated in the lateral direction. The apparatus includes a corrector that performs, based on a zone-to-zone movement history of the recognized target object among the determination zones, a correction task including at least one of a first changing task of changing the width of an activation region, and a second changing task of changing the activation timing. The apparatus includes an activation determiner that activates a safety device upon determining that a position of the recognized target object is within the activation region and that the time to collision is smaller than the activation timing.

11 Claims, 11 Drawing Sheets

(51) Int. Cl.
*B60W 30/085* (2012.01)
*B60W 30/09* (2012.01)
*B60T 7/22* (2006.01)
*G01S 17/00* (2020.01)
*G01S 13/931* (2020.01)
*G08G 1/16* (2006.01)
*G01S 13/86* (2006.01)
*B60W 50/00* (2006.01)

(52) U.S. Cl.
CPC .......... *B60W 30/09* (2013.01); *B60W 30/095* (2013.01); *B60W 50/0097* (2013.01); *B60W 50/0098* (2013.01); *G01S 13/867* (2013.01); *G01S 13/931* (2013.01); *G01S 17/00* (2013.01); *G08G 1/165* (2013.01); *G08G 1/166* (2013.01); *B60T 2201/022* (2013.01); *B60W 2554/00* (2020.02); *B60W 2710/18* (2013.01)

(56) References Cited

U.S. PATENT DOCUMENTS

| | | | |
|---|---|---|---|
| 2003/0060980 A1* | 3/2003 | Prakah-Asante | B60R 21/013 701/301 |
| 2007/0021915 A1* | 1/2007 | Breed | B60W 30/18154 701/301 |
| 2008/0133136 A1* | 6/2008 | Breed | B60W 40/06 701/301 |
| 2014/0350785 A1 | 11/2014 | Tsuchida | |

FOREIGN PATENT DOCUMENTS

| | | |
|---|---|---|
| JP | 2011-189916 | 9/2011 |
| JP | 2012-048460 | 3/2012 |
| JP | 2012-194863 A | 10/2012 |
| JP | 2014-229067 A | 12/2014 |

\* cited by examiner

VEHICLE CONTROL METHOD AND APPARATUS

The present disclosure relates to vehicle control methods and apparatuses for activating a safety device to thereby avoid a collision of an own vehicle with target objects.

BACKGROUND ART

Conventionally, pre-crash safety (PCS) systems are known; these PCS systems mitigate and/or avoid collision damages between an own vehicle and target objects, i.e. obstacles, such as other vehicles, pedestrians, or road structures located in the travelling direction of the own vehicle. Such a PCS system obtains a time to collision (TTC) with an obstacle based on a relative distance of the obstacle with respect to the own vehicle and a relative speed or a relative acceleration of the obstacle relative to the own vehicle. The TTC represents a margin time until which the own vehicle would collide with the obstacle. Then, the PCS system causes a warning device to provide, to the driver of the own vehicle, a warning about the approach of the obstacle, and/or activates a braking device of the own vehicle.

As an example of such a PCS system, there is a vehicle control apparatus disclosed in patent literature 1. The vehicle control apparatus disclosed in patent literature 1 monitors regions located beside a travelling course of an own vehicle, and limits the maximum speed of the own vehicle if there is a target object in one of the monitored regions.

CITATION LIST

Patent Literature

[Patent Literature 1] Japanese Patent Application Publication. No. 2010-208583

SUMMARY

Technical Problem

A target object existing in a region located beside the travelling course of the own vehicle may be travelling parallel with the own vehicle or may be cutting across the travelling course of the own vehicle. The current behavior of the target object may cause the possibility of a collision with the own vehicle to change. From this viewpoint, the vehicle control apparatus disclosed in the patent literature 1 is capable of determining whether there is a target object in regions located beside the travelling course of the own vehicle, but is incapable of controlling the own vehicle in accordance with the current behavior of the target object.

If a target object, such as a two-wheel vehicle, is cutting across the travelling direction of the own vehicle, it is necessary to activate a safety device at the time when the two-wheel vehicle is located diagonally in front of the own vehicle in the travelling direction to thereby avoid a collision of the own vehicle with the two-wheel vehicle.

Unfortunately, the two-wheel vehicle may be travelling in the same direction as the travelling direction of the own vehicle while keeping the location that is diagonally in front of the own vehicle or may be travelling in a meandering or zigzag state. If the approach of the two-wheel vehicle that is travelling in the meandering or zigzag state to the own vehicle is determined as cutting across in front of the own vehicle, this may result in unnecessary activation of a safety device of the own vehicle.

For addressing the problem, a first aspect of the present disclosure mainly aims to provide vehicle control apparatuses, each of which is capable of reducing unnecessary activation of a safety device with respect to a target object that is less likely to cut across in front of an own vehicle in a travelling direction of the own vehicle.

Solution to Problem

A first aspect of the present disclosure relates to a vehicle control apparatus for recognizing a target object existing in front of an own vehicle in a travelling direction of the own vehicle, and for activating, based on a possibility of the recognized target object colliding with the own vehicle, a device as a safety device for avoiding the collision or mitigating damage from the collision. The vehicle control apparatus includes a collision time calculator configured to calculate a collision prediction time that is a prediction time until which the own vehicle is predicted to collide with the recognized target object, and an activation region setter configured to set an activation region ahead of the travelling direction of the own vehicle. The activation region has a predetermined width in a direction perpendicular to a travelling course of the own vehicle. The vehicle control apparatus includes a timing setter configured to set an activation timing indicative of whether to activate the safety device based on a comparison between the activation timing and the collision prediction time, and a determination zone setter configured to set determination zones located diagonally in front of the own vehicle in the travelling direction and separated in the lateral direction. The vehicle control apparatus includes a corrector configured to perform, based on a zone-to-zone movement history of the recognized target object among the determination zones, a correction task that includes at least one of (1) A first changing task of changing the width of the activation region (2) A second changing task of changing the activation timing The vehicle control apparatus includes an activation determiner configured to activate the safety device upon determining that a position of the recognized target object is within the activation region and that the collision prediction time is smaller than the activation timing.

A second aspect of the present disclosure relates to a vehicle control method to be carried out by a vehicle control apparatus for recognizing a target object existing in front of an own vehicle in a travelling direction of the own vehicle, and for activating, based on a possibility of the recognized target object colliding with the own vehicle, a device as a safety, device (31, 32) for avoiding the collision or mitigating damage from the collision. The vehicle control method includes a collision time calculating step of calculating a collision prediction time that is a prediction time until which the own vehicle is predicted to collide with the recognized target object, and an activation region setting step of setting an activation region ahead of the travelling direction of the own vehicle. The activation region has a predetermined width in a direction perpendicular to a travelling course of the own vehicle. The method includes a timing setting step of setting an activation timing indicative of whether to activate the safety device based on a comparison between the activation timing and the collision prediction time, and a determination zone setting step of setting determination zones located diagonally in front of the own vehicle in the travelling direction and separated in the lateral direction. The method includes a correcting step of performing, based on a zone-to-zone movement history of the recognized target object among the determination zones, a correction task that includes at least one of (1) A first changing task of changing the width of the activation region (2) A second changing task of changing the activation timing The method includes an activation determining step of activating the safety device upon determining that a position of the recognized target object is within the activation region and that the collision prediction time is smaller than the activation timing.

Each of the vehicle control apparatus and vehicle control method according to the respective first and second aspects of the present disclosure sets the determination zones located diagonally in front of the own vehicle in the travelling direction and separated in the lateral direction. Each of the vehicle control apparatus and vehicle control method obtains a movement direction tendency of the recognized target object based on the zone-to-zone movement history of the recognized target object among the determination zones.

The tendency enables each of the vehicle control apparatus and vehicle control method according to the respective first and second aspects of the present disclosure to determine whether the recognized target object is moving closer to the travelling course of the own vehicle.

Additionally, each of the vehicle control apparatus and vehicle control method is configured to change, based on the zone-to-zone movement history of the recognized target object among the determination zones obtained by the determination zones and the position of the recognized object, at least one of (1) The first changing task of changing the width of the activation region (2) The second changing task of changing the activation timing This configuration therefore enables unnecessary activation of the safety device to be reduced.

DESCRIPTION OF THE EMBODIMENTS

Figure 1:
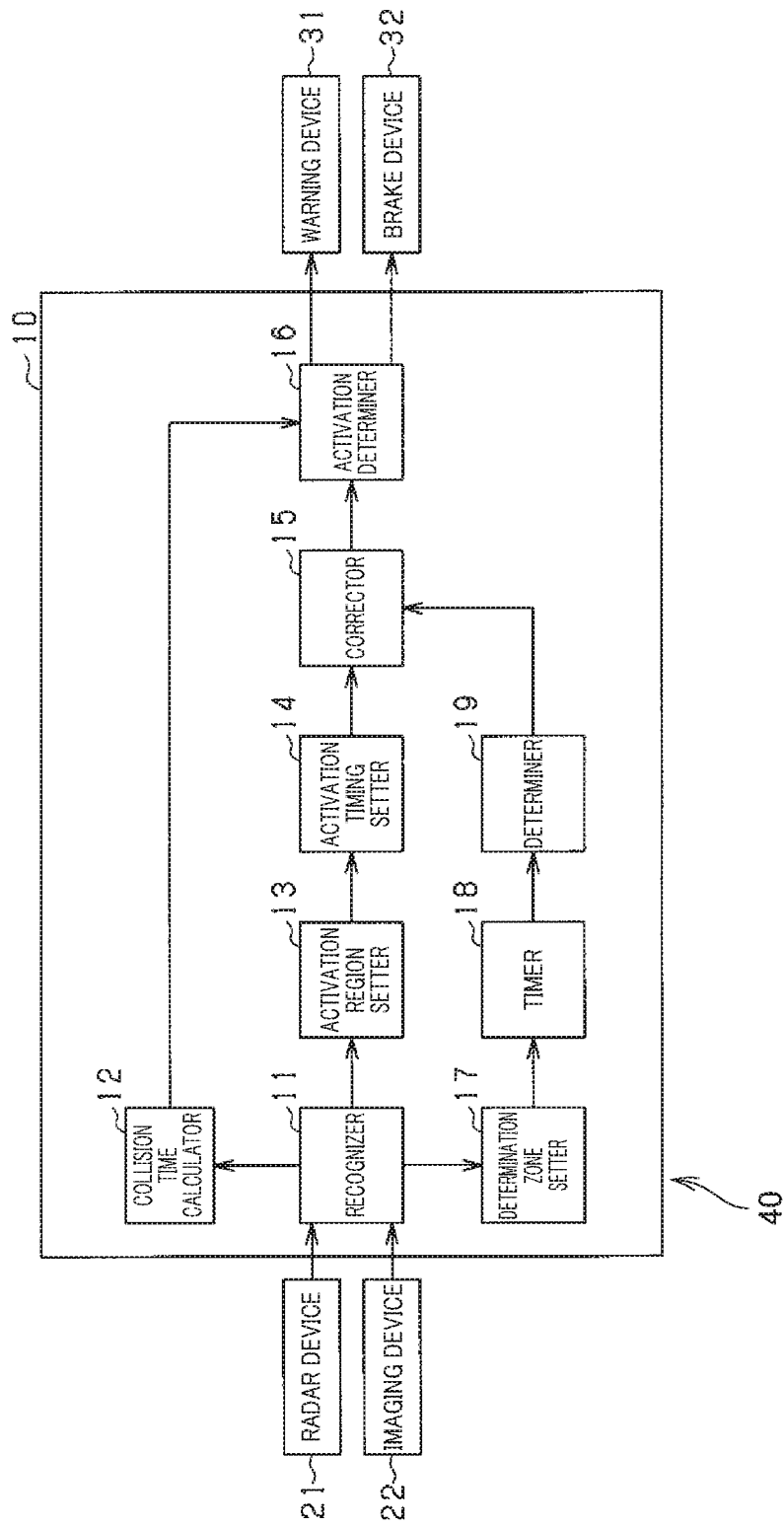
FIG. 1 is a schematic structural diagram of a vehicle control apparatus according to the first embodiment of the present invention.

The following describes embodiments of the present disclosure with reference to the accompanying drawings. Descriptions of elements of each embodiment can be applied to the corresponding elements, to which like reference characters are assigned, of the other embodiments.

First Embodiment

A vehicle control apparatus according to the first embodiment is installed in an own vehicle 40.

The vehicle control apparatus serves as a PCS system that

1. Determines whether a target object is located around the own vehicle 40, such as in the forward direction of the own vehicle 40

2. Performs control to avoid collision between the target object and the own vehicle 40 and/or mitigate damage due to collision therebetween upon determination that the target object is located around the own vehicle 10

Referring to FIG. 1, a vehicle control apparatus 10 includes a computer that is comprised of a CPU, a memory including a ROM and a RAM, and an I/O unit. The CPU of the vehicle control apparatus 10 runs programs installed in, for example, the ROM to implement various functions described later.

A radar device 21 and an imaging device 22 are connected to the vehicle control apparatus 10 as sensor devices for inputting various pieces of detected information to the vehicle control apparatus 10.

For example, the radar device 21 is an available millimeter radar transmitting a high-frequency signal within a millimeter wave range as its transmission waves, and is mounted at, for example, the center of the front end of the own vehicle 40. The radar device 21 has a center axis extending, from the center of the front end of the own vehicle 40, in the travelling direction of the own vehicle 40. The radar device 21 has a predetermined detection range that has a predetermined view angle, such as a detection angle, or scanning angle, and extends in the right and left direction around the center axis. That is, the radar device 21 is capable of detecting the position of a target object within the detection range.

Specifically, the radar device 21 transmits probe waves to the detection range through a transmitting antenna in a predetermined period, and receives reflected waves, i.e. echoes, based on reflection of the transmitted radar waves by a target object through respective receiving antennas. The radar device 21 calculates the distance of the target object from the own vehicle 40 based on the transmission time of the prove waves and the reception times of the respective reflected waves.

The radar device 21 also calculates the relative speed of the target object relative to the own vehicle 40 based on the frequencies of the reflection waves based on reflection of the transmitted radar wave by the target object; the frequencies have been changed based on Doppler effect.

In addition, the radar device 21 calculates the azimuth of the target object based on the differences in phase between the reflection waves received by the respective receiving antennas.

Note that the radar device 21 is capable of identifying the relative position of the target object relative to the own vehicle 40 based on the calculated position and azimuth of the target object. Note that the radar device 21 performs, in the predetermined period, referred to as a first period, a task of 1. Transmitting the radar wave
2. Receiving the reflection waves based on reflection of the transmitted radar wave
3. Calculating the reflection position, i.e. the relative position of a target object and the own vehicle 40, and the relative speed of the target object relative to the own vehicle 40 in accordance with the received reflection waves Then, the radar device 21 sends the reflection position and the relative speed of the target object to the vehicle control apparatus 10 as first detection information. Note that target objects detected by the radar device 21 will be referred to as radar-based objects.

The imaging device 22 is designed as a monocular imaging device, such as a CCD camera device, a CMOS image sensor device, or a near-infrared camera device. For example, the imaging device 22 is mounted to the center of the own vehicle 40 in the vehicle width direction at a predetermined height, and has an optical axis extending in front of the own vehicle 40. The imaging device 22 has a region, i.e. an imaging range, that horizontally extends around the optical axis within a predetermined angular range, i.e. a predetermined angle of view. The imaging device 22 captures, from the predetermined height, from a higher point of view, images of the region, i.e. the imaging range.

The imaging device 22 extracts, from a captured image, i.e. a frame image, feature points each indicative of the existence of a target object. Specifically, the imaging device 22 extracts edge points from the captured image based on light-intensity information included in the captured image. Then, the imaging device 22 performs Hough transform of the extracted edge points. The Hough transform is capable of extracting, as feature points, points on a straight line on which some of the edge points are aligned, and/or points at which straight lines intersect. Note that the imaging device 22 performs, in a second period different from the first period of the radar device 21, a task of 1. Capturing a frame image
2. Extracting feature points for a target object The imaging device 22 sends, to the vehicle control apparatus 10, the results of extracting the feature points as second detection information for the target object as second detection information. Target objects detected by the imaging device 22 will be referred to as image-based objects.

The own vehicle 40 includes a warning device 31 and a brake device 32 as its safety devices that are driven in response to control instructions sent from the vehicle control apparatus 10.

The warning device 31 includes a speaker and/or a display mounted in the compartment of the own vehicle 40. The warning device 31 is configured to output warnings including, for example, warning sounds and/or warning messages to inform the driver of a risk of collision in response to a control instruction sent from the vehicle control apparatus 10 when the vehicle control apparatus 10 determines that there is a high risk of collision of the own vehicle 40 with a target object.

The brake device 32 is configured to brake the own vehicle 40. The brake device 32 is activated in response to a control instruction sent from the vehicle control apparatus 10 when the vehicle control apparatus 10 determines that there is a high risk of collision of the own vehicle 40 with a target object. Specifically, the brake device 32 performs a brake-assist function of increasing braking force, which is based on the driver's brake operation, to the own vehicle 40, or an automatic brake function of automatically braking the own vehicle 40 if there is no braking operation by the driver.

The vehicle control apparatus 10 functionally includes a recognizer 11, a collision time calculator 12, an activation region setter 13, an activation timing setter 14, a corrector 15, an activation determiner 16, a determination zone setter 17, a timer 18, and a determiner 19.

The recognizer 11 periodically obtains the first detection information from the radar device 21, and periodically obtains the second detection information from the imaging device 22.

The recognizer 11 obtains first position information for each radar-based object based on the position of the corresponding radar-based object, i.e. the reflection position of the corresponding radar-based object, and second position information for each image-based object based on the feature points corresponding to the image-based object. Then, the recognizer 11 determines that a radar-based object and an image-based object are the same object when the corresponding first position information is close to the corresponding second position information. Next, the recognizer 11 matches the corresponding first position information with the corresponding second position information.

Specifically, if the second position information about an image-based object is located to be close to the first position information about a radar-based object, there is a high probability of a corresponding actual object being located at the position based on the first position information. The state where the first position information about each radar-based object is identical to or close to the second position information about the corresponding image-based object will be referred to as a fusion state. In other words, the fusion state shows that the radar device 21 and the imaging device 22 have each obtained the position of an object with high accuracy.

The recognizer 11 periodically performs an object recognition task that includes 1. Obtaining the first detection information for each radar-based object
2. Obtaining the second detection information for each image-based object
3. Obtaining the fusion information about each target object detected in the fusion state The recognizer 11 stores, for each period, the position information about each radar-based object, the position information about each image-based object, and the position information about each target object, i.e. each fusion-based object, detected in the fusion state into the memory as a detection history. The fusion information can include identification information.

Note that the position information in each of the first detection information, the second detection information, and the fusion information obtained from an object includes at least 1. A position, i.e. a longitudinal position, of the detected shape of the target object in the travelling direction, i.e. the longitudinal direction, of the own vehicle 40
2. A position, i.e. a lateral position, of the detected shape of the target object in the direction, i.e. the lateral direction, perpendicular to the travelling direction of the own vehicle 40

For a fusion-based object, the recognizer 11 refers to the detection history in accordance with identification information about the fusion-based information for each period to correspondingly determine whether the fusion-based object has been continuously in the fusion state. The recognizer 11 determines that the fusion-based object is located at the corresponding position, i.e. the first position based on the detection result by the radar device 21, upon determination that the fusion-based object has been continuously in the fusion state. In addition, when it is determined that the fusion-based object has not been detected in a period, the recognizer 11 refers to the detection history for the fusion-based object, and assumes that the fusion-based object was at the previous position, i.e. the position detected in the previous period.

Additionally, the recognizer 11 performs pattern matching of the second detection information about a fusion-based object with feature patterns of many target objects including vehicles, pedestrians, and roadside objects. Then, the recognizer 11 causes, based on the result of the pattern matching, the fusion-based object to correlate with a selected corresponding type. The types of target objects include vehicles, motor cycles, bicycles, pedestrians, and various kinds of roadside objects. Note that the motorcycles and bicycles are collectively referred to as two-wheel vehicles.

Next, the recognizer 11 causes, for each fusion-based object, the corresponding relative position and relative speed relative to the own vehicle 40 to correlate with one another. The relative position relative to the own vehicle 40 includes the lateral position indicative of the relative position in the direction perpendicular to the travelling direction of the own vehicle 40, and the longitudinal position indicative of the relative position in the travelling direction of the own vehicle 40.

Then, the recognizer 11 calculates, based on the corresponding relative position and relative speed for each fusion-based object, a lateral speed and a longitudinal speed. The lateral speed represents a relative speed in the direction, i.e. the lateral direction, perpendicular to the travelling direction of the own vehicle 40, and the longitudinal speed represents a relative speed in the travelling direction, i.e. the longitudinal direction, of the own vehicle 40.

In addition, the recognizer 11 classifies the type of each fusion-based object in accordance with the identified type, the lateral speed, and the longitudinal speed.

If the fusion-based object is a vehicle, the recognizer 11 classifies, based on the longitudinal speed, the vehicle into any one of 1. A preceding vehicle travelling in the same direction as the travelling direction of the own vehicle 40 ahead of the own vehicle 40
2. An oncoming vehicle travelling in an oncoming lane ahead of the own vehicle 40 in the travelling direction
3. A stopped vehicle stopped ahead of the own vehicle 40 in the travelling direction If the fusion-based object is a bicycle, the recognizer 11 classifies, based on the lateral speed and the longitudinal speed, the bicycle into any one of 1. A preceding bicycle travelling in the same direction as the travelling direction of the own vehicle 40 ahead of the own vehicle 40
2. An oncoming bicycle travelling in the opposite direction of the travelling direction of the own vehicle ahead of the own vehicle 40
3. A stopped bicycle stopped ahead of the own vehicle 40 in the travelling direction
4. A crossing bicycle crossing ahead of the own vehicle 40 in the travelling direction In addition, for a radar-based object detected based on only the first detection information, the recognizer 11 classifies, based on the longitudinal speed and the speed of the own vehicle 40, the radar-based object into any one of 1. A preceding target object moving in the same direction as the travelling direction of the own vehicle 40 ahead of the own vehicle 40
2. An oncoming target object moving in the direction opposite to the travelling direction of the own vehicle 40 ahead of the own vehicle 40 in the travelling direction
3. A stopped target object stopped ahead of the own vehicle 40 in the travelling direction.

The collision time determiner 12 calculates a time to collision (TIC), which represents a time until which the longitudinal position of a target object indicative of the relative distance of the target object relative to the own vehicle 40 would become zero. Specifically, the collision time determiner 12 divides the longitudinal position of a recognized target object by the longitudinal speed indicative of the relative speed between the recognized target object and the own vehicle 40 to thereby obtain a time. Then, the collision time determiner 12 sets the obtained time as a margin time taken until which the own vehicle 40 is predicted to collide with the recognized target object, i.e. a collision margin time, or a time to collision (ITC), i.e. a collision prediction time.

If the longitudinal speed of the recognized target object is zero or a negative value that represents the recognized target object receding from the own vehicle 40, the collision time calculator 12 does not calculate the time to collision, because the longitudinal position of the recognized target object does not decrease. Note that the collision time calculator 12 can calculate, based on the relative distance, relative speed, and relative acceleration of the recognized target object relative to the own vehicle 40, the time to collision assuming that the recognized target object is moving with constant acceleration. In this modification, even if the relative speed between the own vehicle 40 and the recognized target object is a negative value, i.e. the recognized target object is receding from the own vehicle 40 at the calculation timing of the relative speed, the collision time calculator 12 is configured to calculate the time to collision upon the relative acceleration being a positive value, i.e. the relative speed is changing in the positive direction.

The activation region setter 13 sets activation regions each having a predetermined width in the lateral direction perpendicular to the travelling direction of the own vehicle 40. Each activation region represents a region for determining whether the lateral position of the recognized target object represents a position at which a corresponding safety device should be activated. Specifically, if the lateral position of the recognized target object is within one of the activation regions, the activation region setter 13 determines that one condition for activating the corresponding safety device is satisfied. Note that the widths of the activation regions for the respective functions of the safety devices can be different from each other or can be equal to each other.

For example, the activation region setter 13 sets the width of the activation region for the warning device 31 to be the largest. This is because, if the driver notices a risk of a collision by the warning device 31 and performs operations to avoid a collision, it is possible to avoid a collision without the vehicle control apparatus 10 sending the control instruction to the brake device 32.

The activation timing setter 14 sets an activation timing for each safety device, and compares the activation timing for each safety device with the above time to collision. If the position of the recognized target object is within the activation region set for a safety device and the time to collision becomes equal to or lower than the activation timing set for the safety device, the activation timing setter 14 activates the safety device corresponding to the activation region and the activation timing. That is, the larger an activation timing is set, the earlier the corresponding safety device is activated even if the corresponding time to collision is a large value.

Different values of the activation timing are set for the respective functions of the safety devices.

Specifically, the activation timing for the warning device 31 is set to be the earliest in all the warning device 31 and 32. This is because, if the driver notices, by the warning device 31, a possibility of the own vehicle 40 colliding with a recognized target object to depress the brake pedal, the brake device 32 is activated to brake the own vehicle 40 in response to the depression of the brake pedal, making it possible to avoid this collision without the vehicle control apparatus 10 outputting the control instruction to the brake device 32.

As the activation timings for the brake device 32, the activation timings are individually determined for the brake-assist function and the automatic brake function. These activation timings can be set to be equal to each other or different from each other.

Figure 2:
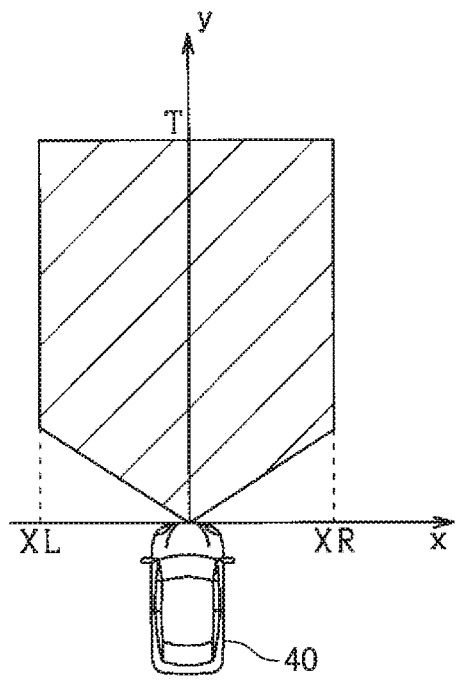
FIG. 2 is a view illustrating an activation region and an activation timing according to the first embodiment.

Next, the following describes an activation region and an activation timing with reference to FIG. 2. In FIG. 2, the travelling direction of the own vehicle 40 is defined as a longitudinal axis, i.e. a y axis, and the direction perpendicular to the longitudinal axis is defined as a lateral axis, i.e. an x axis.

The activation region has a predetermined width in the x axis direction. The activation region has a rightward width XR indicative of a width in the rightward direction, and a leftward width. XL indicative of a width in the leftward direction. The rightward and leftward widths XR and XL of an activation region are previously determined for the respective types of target objects.

The activation region has a length, i.e. a depth, in the y direction; the length of the activation region represents a corresponding activation timing T. Multiplying the activation timing by the relative speed, i.e. the longitudinal speed; between the own vehicle 40 and a target object represents the position of the target object. For this reason; the length of the activation region is based on the corresponding activation timing. That is, the activation timings are previously determined for the respective types of target objects. Note that the activation region is set along the shape of a road on which the own vehicle 40 is travelling. Specifically, if the own vehicle 40 is travelling on a curved section of the road, the activation region is set such that the longitudinal edges of the activation region are parallel with the corresponding road shape.

The activation regions set by the activation region setter 13 and the activation timings set by the activation timing setter 14 are corrected by the corrector 15, and thereafter input to the activation determiner 16.

The activation determiner 16 determines whether the lateral position of a recognized target object is within each of the activation regions. Upon determining that the lateral position of the recognized target object is within an activation region, the activation determiner 16 determines that one condition for activating a safety device corresponding to the activation region is satisfied. Upon determining that all the conditions for activating the safety device are satisfied, the activation determiner 16 sends the control instruction to the safety device, thus causing the safety device to perform the corresponding function.

If a bicycle, which is for example a recognized target object, is crossing across in front of the own vehicle 40, activating a safety device in response to the entering of the recognized target object into a region in front of the own vehicle 40 would be too late; the region has the width that is equal to the width of the own vehicle 40. For this reason, it is necessary to set the activation region whose width is larger than the width of the own vehicle 40 by several meters. If the activation region is set to be farther than the width of the own vehicle 40 by several meters, there would be a possibility of activation for a bicycle that has low possibility of collision with the own vehicle 40; the bicycle is for example travelling diagonally in front of the own vehicle 40 in the identical or different travelling direction of the own vehicle 40. This activation of the safety device would be unnecessary activation, because it is unnecessary to activate the safety device.

For this reason, the activation determiner 16 is configured to reduce, based on the relative speed between the own vehicle 40 and a bicycle, unnecessary activation of the safety devices if the bicycle is located diagonally in front of the own vehicle 40 and is travelling in the identical or opposite direction of the own vehicle 40.

Specifically, the corrector 15 is configured to perform a task, i.e. a reducing task, that reduces the width of the activation region, and a task, i.e. a delaying task, that delays the activation timing.

Note that, if a bicycle is travelling in meandering in its lateral direction, the lateral speed of the bicycle is detected. This situation would make it difficult to determine whether the bicycle is travelling in the same travelling direction as the own vehicle 40 or is crossing across the traveling course of the own vehicle 40. This would result in inactivation of the safety devices and/or unnecessary activation of the safety devices.

From this viewpoint, the determination zone setter 7 according to the first embodiment is configured to set determination zones located diagonally ahead of the own vehicle 40 in the travelling direction to thereby distinguish target objects that are moving in the identical or opposite direction of the own vehicle 40 from other target objects that are crossing ahead of the own vehicle 40 in the travelling direction.

Figure 3:
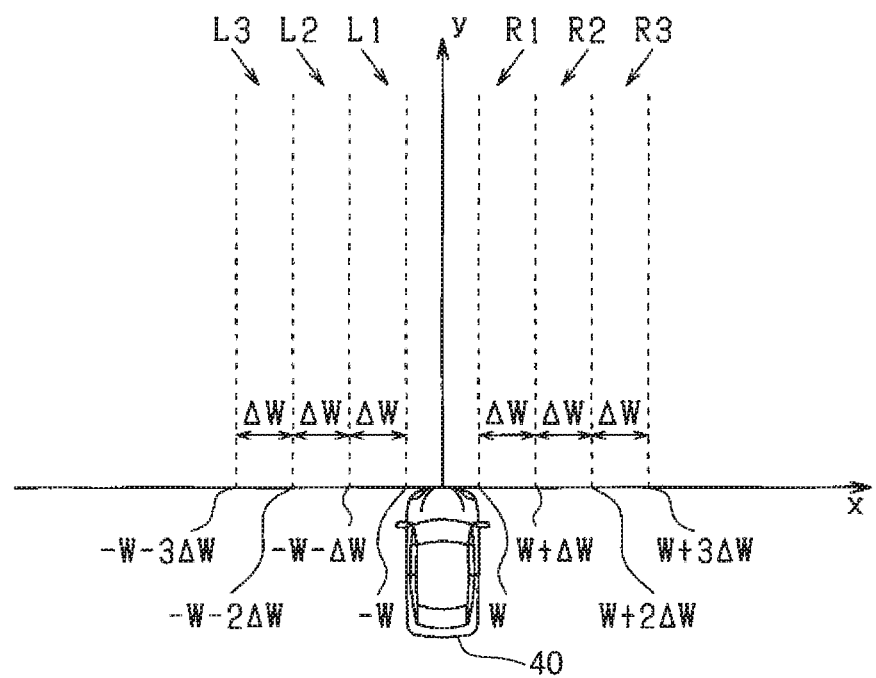
FIG. 3 is a view illustrating how to establish determination zones according to the first embodiment.

The following describes the determination zone with reference to FIG. 3. In 3, the right direction relative to the own vehicle 40 is defined as the positive direction of the x axis.

The determination zone is comprised of plural zones separated in the lateral direction perpendicular to the travelling direction of the own vehicle 40. The separated zones are partitioned by partition lines that are parallel with the travelling direction of the own vehicle 40, so that the separated zones are located parallel with the travelling direction of the own vehicle 40. On the right side of the travelling direction of the own vehicle 40, a rightward first zone R1 that is the nearest to the travelling course of the own vehicle 40, a rightward second zone R2, and a rightward third zone R3 that is the farthest from the travelling course of the own vehicle 40, are provided.

Similarly, on the left side of the travelling direction of the own vehicle 40, a leftward first zone L1 that is the nearest to the travelling course of the own vehicle 40, a leftward second zone L2, and a leftward third zone L3 that is the farthest from the travelling course of the own vehicle 40, are provided.

The closer edge of the rightward first zone R1 to the travelling direction of the own vehicle 40 is located to be far away from the travelling direction of the own vehicle 40 by a length W; the length W is set to be half of the width of the own vehicle 40. The closer edge of the leftward first zone L1 to the travelling direction of the own vehicle 40 is located to be far away from the travelling direction of the own vehicle 40 by the length W. This means that no determination zones are provided in an area having the width of the own vehicle 40 and extending in front of the own vehicle 40 in the travelling direction.

Each of the zones R1, R2, R3, L1, L2, and L3 has a width $\Delta W$ in the lateral direction. The lateral width $\Delta W$ is set to, for example, a value within the order of 1 or 2 meters, and can be set based on the detection period of the position of a corresponding target object and an estimated speed of the corresponding target object.

The rightward edge of the activation region illustrated in FIG. 2 is located to the left of the rightward edge of the rightward third zone R3, and the leftward edge of the activation region illustrated in FIG. 2 is located to the right of the leftward edge of the leftward third zone L3.

The timer 18 identifies, based on the lateral position of a recognized target object, which of the determination zones the recognized target object is located in. Then, the tinier 18 measures a time for which the recognized target object has stayed in the same determination zone. Specifically, the timer 18 starts measuring a time upon determining that a recognized target object is staying in any one of the determination zones, and stops measuring the time upon determining that the recognized target object is moving from the determination zone to another determination zone.

The time measuring task carried out by the timer 18 is configured to collectively hold (1) A residence time of a recognized target object measured from the latest zone-to-zone movement to the present (2) A residence time of the recognized target object measured between an immediate previous zone-to-zone movement and the latest movement The immediate previous zone-to-zone movement represents the zone-to-zone movement of the recognized target object immediately before the latest movement.

The determiner 19 determines whether a recognized target object is travelling parallel with the own vehicle 40 or the recognized target object is moving so as to possibly cross across, i.e. to perform crossing movement across, the travelling course of the own vehicle in accordance with the movement history among zones in the determination zones and the residence times.

If the recognized target object has continuously moved among the determination zones in the direction of the recognized target object being close to the own vehicle 40, a first condition for determining that the recognized target object is performing the crossing movement is satisfied. In addition, if each of the residence times is smaller than a predetermined time, a second condition for determining that the recognized target object is performing the crossing movement is satisfied.

The determiner 19 determines that the recognized target object is performing the crossing movement upon both the first and second conditions being satisfied. Then, the determiner 19 is configured not to perform the reducing task and the delaying task upon determining that both the first and second conditions are satisfied.

On the other hand, if at least one of the first condition and the second condition is unsatisfied, the recognized target object is less likely to be performing the crossing movement, but likely to be travelling parallel with the own vehicle 40. For this reason, the determiner 19 is configured to perform the reducing task and the delaying task, thus avoiding unnecessary activation of the safety devices.

Figure 4:
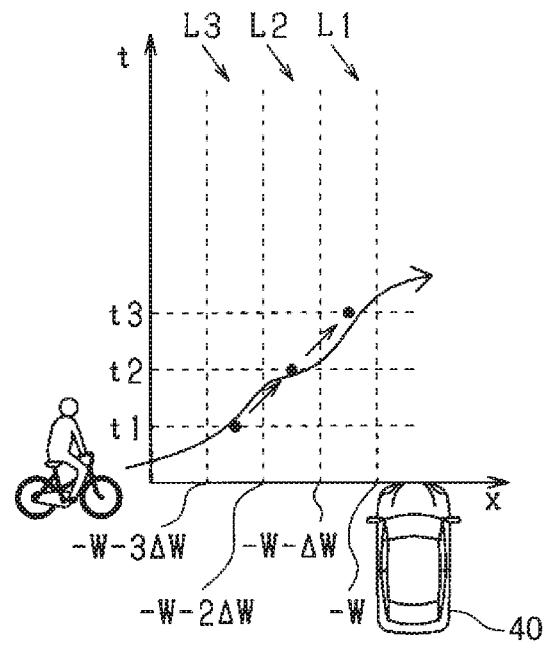
FIG. 4 is a view illustrating an example of determining that the movement of a recognized target object represents a crossing movement according to the first embodiment.

FIG. 4 illustrates how the lateral position of a recognized target object is changed over time when the recognized target object has been performing the crossing movement. In FIG. 4, the horizontal axis represents the lateral position of the recognized target object, and the vertical axis represents time. Each interval of the time shown in the vertical axis represents one control period. If the recognized target object has been continuously existing in the same zone at least for the length of three control periods, the second condition for determination about execution of the correction task is satisfied. Otherwise, the residence time for which the recognized target object has been continuously staying in the same zone is less than the length of the three control periods, the second condition for determination about execution of the correction task is unsatisfied.

In FIG. 4, the recognized target object has existed in the third zone L3 at time t1, has existed in the second zone L2 at time t2, and is existing in the first zone L1 at time t3. The movement history of the recognized target object among the zones shows that (1) The recognized target object has moved closer to the travelling course of the own vehicle 40 between the times t1 and t2

(2) The recognized target object has further moved to approach the travelling course of the own vehicle 40 between the times t2 and t3

This movement history makes clear that the recognized target object is likely to enter the travelling course of the own vehicle 40, resulting in no execution of the correction task.

Figure 5:
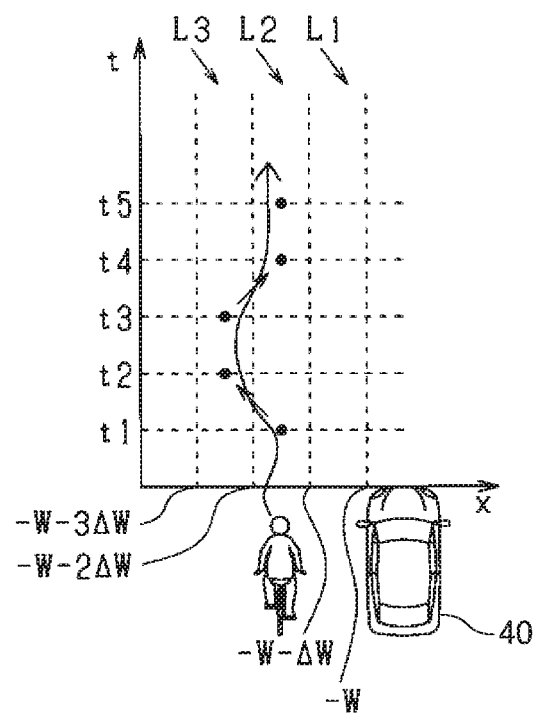
FIG. 5 is a view illustrating an example of determining that the movement of a recognized target object represents a parallel travelling according to the first embodiment.

FIG. 5 illustrates how the lateral position of a recognized target object is changed over time when the recognized target object has been travelling parallel with the own vehicle 40. In FIG. 5, the recognized target object has existed in the second zone L2 at time t1, has existed in the third zone L3 between time t2 and time t3, and has been existing in the second zone L2 between time t4 and time t5.

The latest zone-to-zone movement of the recognized target object between the time t4 and the time t5 is determined as the movement approaching the travelling course of the own vehicle 40. However, the immediate previous zone-to-zone movement of the recognized target object is determined as the movement separating from the travelling course of the own vehicle 40 between the time t1 and the time t2. That is, the recognized target object has not continuously moving in the direction approaching the travelling course of the own vehicle 40.

This makes clear that the recognized target object is likely to be travelling parallel with the own vehicle 40 and unlikely to enter the travelling course of the own vehicle 40, resulting in execution of the correction task. Note that FIG. 5 illustrates an example where the recognized target object has been travelling between the second zone L2 and the third zone L3.

Figure 6:
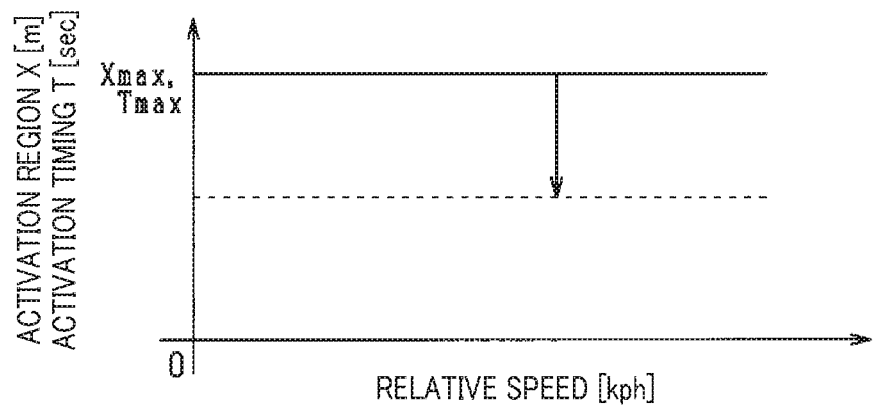
FIG. 6 is a view illustrating an activation region and an activation timing in execution of a correction task according to the first embodiment.

The following describes how the activation region and the activation timing are corrected based on the correction task carried out by the corrector 15 with reference to FIG. 6. In FIG. 6, the vertical axis shows the activation timing T and the width, referred to as X, of the activation region; the width X is comprised of the rightward width XP and the leftward width XL. The horizontal axis in FIG. 6 shows, for example, the relative speed between the own vehicle 40 and a recognized target object. The horizontal axis in FIG. 6 can shown another parameter.

FIG. 6 shows that the width X of the activation region and the activation timing T are respectively set as their upper limits Xmax and Tmax if no correction task is carried out (see the solid line in FIG. 6). These upper limits Xmax and Tmax are previously determined values, which are also referred to as reference values. FIG. 6 also shows a value of the width X of the activation region and a value of the activation timing T if the correction task has been carried out (see the dashed line in FIG. 6).

That is, execution of the correction task results in the width of the activation region and the activation timing being set to be smaller than the respective upper limits Xmax and Tmax. Note that the correction task can be configured to reduce a predetermined value from each of the upper limits or to change each of the upper limits to a predetermined value.

Figure 7:
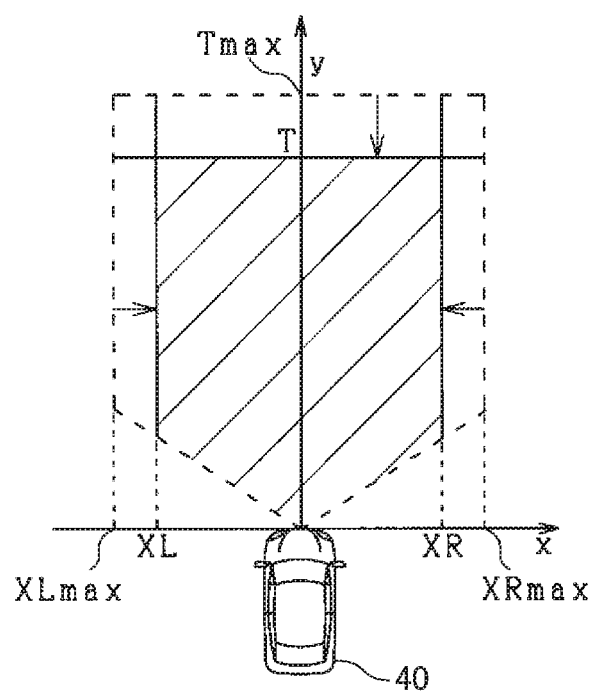
FIG. 7 is a view illustrating an activation region and an activation timing after the correction task has been carried out according to the first embodiment.

FIG. 7 illustrates a corrected activation region and a corrected activation timing obtained by the corrector 15. The correction task carried out by the corrector 15 enables the rightward width XR and the leftward width XL of the corrected activation region to be smaller than respective reference values, i.e. rightward and leftward upper limits XRmax and XRmax. The correction task carried out by the corrector 15 enables the activation timing of the corrected activation region to be smaller than the upper limit Tmax. Specifically, the correction task makes it difficult for a recognized target object to stay in the corrected activation region. In addition, the correction task results in the safety devices being activated when the time to collision becomes a smaller value.

Figure 8:
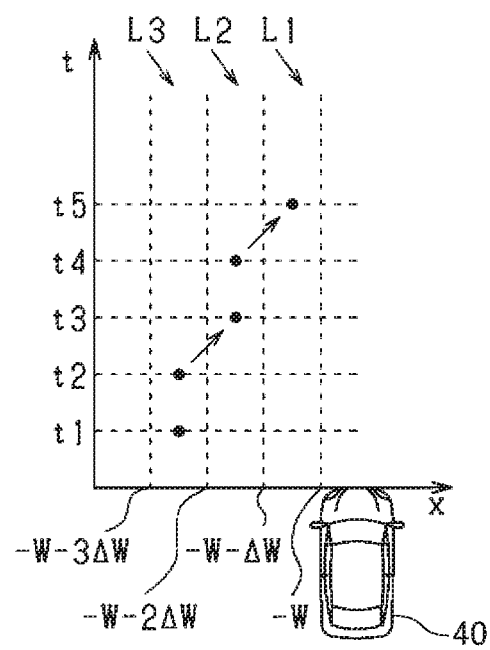
FIG. 8 is a view illustrating another example of determining that the movement of a recognized target object represents a crossing movement according to the first embodiment.

FIG. 8 illustrates another example of how the lateral position of a recognized target object is changed over time when the recognized target object has been performing the crossing movement.

In FIG. 8, the recognized target object has existed in the third zone L3 at each of time t1 and time t2, has existed in the second zone L2 at each of time t3 and time t4, and is existing in the first zone L1 at time t5.

Because the residence time for which the recognized target object has stayed in each of the third and left zones L3 and L2 is smaller than the predetermined value, i.e. the length of the three control periods, this satisfies the second condition for determination about execution of the correction task is satisfied. In addition, the recognized target object has moved closer to the travelling course of the own vehicle 40 between the times t1 and t2, and the recognized target object has further moved to approach the travelling course of the own vehicle 40 between the times t2 and t3.

This makes clear that the recognized target object illustrated in FIG. 8 is likely to enter the travelling course of the own vehicle 40 although the lateral speed of the recognized target object illustrated in FIG. 8 is slower than the lateral speed of the recognized target object illustrated in FIG. 4, resulting in no execution of the correction task.

Figure 9:
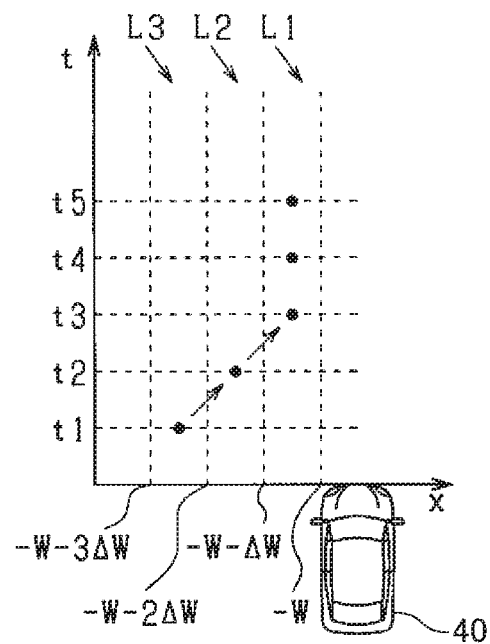
FIG. 9 is a view illustrating an example of determining that, after determining that the movement of a recognized target object represents a crossing movement, the movement of the recognized target object represents a parallel travelling according to the first embodiment.

FIG. 9 illustrates example of the behavior of a recognized target object when the behavior of the recognized target object, which satisfied a requirement of no execution of the correction task, has been changed to satisfy a requirement of execution of the correction task.

In FIG. 9, the recognized target object has existed in the third zone L3 at time t1, has existed in the second zone L2 at time t2, and has been existing in the first zone L1 from time t3 to time t5.

Because the recognized target object has continuously moved closer to the travelling course of the own vehicle 40, the correction task was not carried out until time t4 at which the residence time is smaller than the predetermined value. In contrast, the residence time of the recognized target object in the first zone L1, i.e. the residence time of the recognized target object measured from the latest zone-to-zone movement (see from the time t2 to the time t3) to the present (see the time t5), becomes a value equal to or larger than the predetermined value, i.e. the length of the three control periods. This results in the correction task being started from the time t5.

Figure 10:
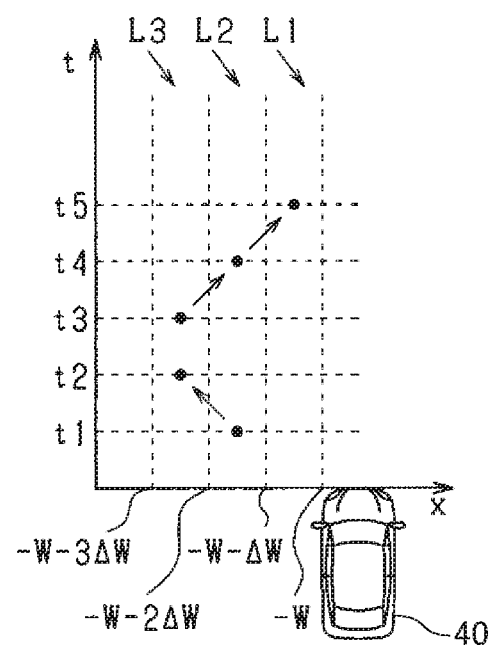
FIG. 10 is a view illustrating an example of determining that, after determining that the movement of a recognized target object represents a parallel travelling, the movement of the recognized target object represents a crossing movement according to the first embodiment.

FIG. 10 illustrates an example of the behavior of a recognized target object when the behavior of the recognized target object, which satisfied a requirement of execution of the correction task, has been changed to satisfy a requirement of no execution of the correction task.

In FIG. 10, the recognized target object has existed in the second zone L2 at time t1, has existed in the third zone L3 at each of time t2 and time t3, and has existed in the second zone L2 at time t1.

Because the recognized target object has moved away from the travelling course of the own vehicle 40 from the time t1 to the time t2, the correction task was carried out. Because, at the time t3, the latest zone-to-zone movement of the recognized target object shows movement away from the travelling course of the own vehicle 40, the correction task has been continuously carried out.

Additionally, at the time t4, although the recognized target object has moved closer to the travelling course of the own vehicle 40, because the latest zone-to-zone movement of the recognized target object shows movement away from the travelling course of the own vehicle 40, the correction task has also been continuously carried out.

At time t5, the recognized target object has been moving closer to the travelling course of the own vehicle 40 from the time t4, and the latest zone-to-zone movement of the recognized target object shows movement closer to the travelling course of the own vehicle 40 (see from the time t3 to the time t4). Additionally, at the time t5, the residence time of the recognized target object in the first zone L1 is smaller than the predetermined value. The above situations satisfy the requirement of no execution of the correction task.

Figure 11:
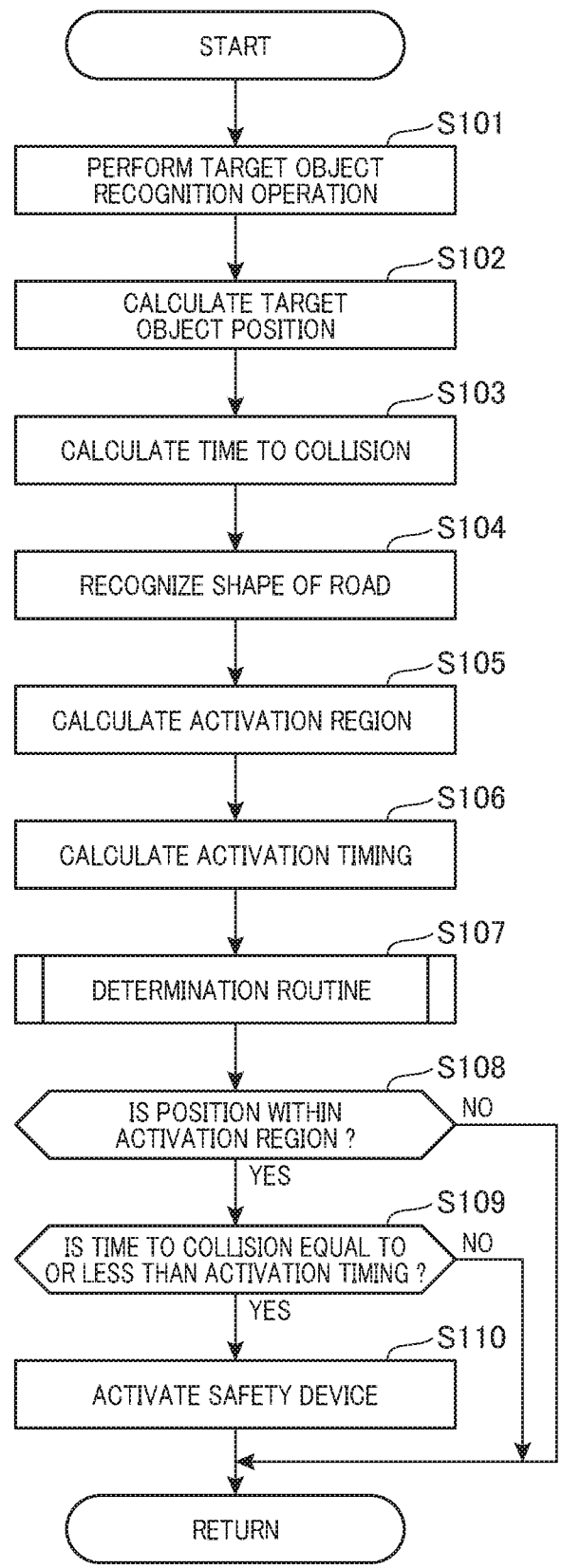
FIG. 11 is a flowchart illustrating the sequence of operations carried out by the vehicle control apparatus illustrated in FIG. 1.

The following describes the sequence of operations carried out by the vehicle control apparatus 10 according to the first embodiment with reference to the flowchart of FIG. 11. The flowchart of FIG. 11 is carried out in the predetermined control period by the vehicle control apparatus 10. That is, the vehicle control apparatus 10 serves as a main component to carry out the following steps S101 to S110, some of which are abbreviated by only characters S. The description of the main component itself can be omitted.

First, the vehicle control apparatus 10 obtains the first detection information from the radar device 21, and the second detection information from the imaging device 22 in step S101. Then, the vehicle control apparatus 10 performs the object recognition task in accordance with the first detection information and the second detection information from the imaging device 22 in step S101 to thereby calculate the position of a recognized target object in step S102. Thereafter, the vehicle control apparatus 10 calculates, based on the position of the recognized target object and the relative speed of the recognized target relative to the own vehicle 40, a time to collision (TTC) for the recognized target object in step S103.

Next, the vehicle control apparatus 10 recognizes the shape of a road on which the own vehicle 40 is travelling in step S104, calculates the activation region for the recognized target object in step S105, and calculates the activation timing for the recognized target object in step S106.

After the activation region and the activation timing have been calculated, the vehicle control apparatus 10 performs a determining routine based on the determination zones illustrated in FIGS. 3 to 5 to thereby determine whether to correct the calculated activation region and the activation tinning in step S107.

After completion of the determining routine, the vehicle control apparatus 10 determines whether the position of the recognized target object is located within the corresponding activation region in step S108. Upon determining that the position of the recognized target object is located within the corresponding activation region (YES in step S108), the vehicle control apparatus 10 determines that one condition for activating the corresponding safety device is satisfied. Then, the vehicle control apparatus 10 determines whether the time to collision for the recognized target object is equal to or less than the activation timing in step S109.

Upon determining that the time to collision for the recognized target object is equal to or less than the activation timing (YES in step S109), the vehicle control apparatus 10 determines that all the conditions for activating the corresponding safety device are satisfied. Then, the vehicle control apparatus 10 activates the corresponding safety device, and thereafter terminates the sequence of the operations.

Otherwise, upon determining that the position of the recognized target object is located outside the activation region (NO in step S108) or that the time to collision for the recognized target object is more than the activation timing (NO in step S109), the vehicle control apparatus 10 determines that at least one of the conditions for activating the corresponding safety device is unsatisfied. Then, the vehicle control apparatus 10 terminates the sequence of the operations without activating the corresponding safety device.

Figure 12:
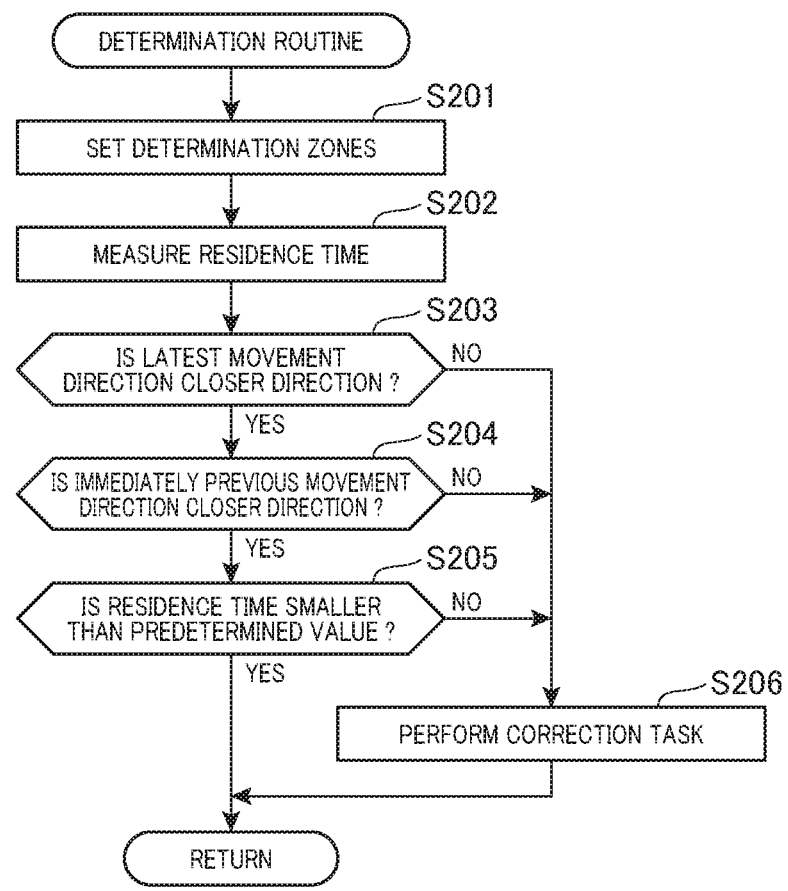
FIG. 12 is a subroutine indicative of a determining routine using the determination zone in the flowchart illustrated in FIG. 11.

FIG. 12 illustrates a subroutine of the determining routine in step S107.

First, the vehicle control apparatus 10 sets the determination zones located at diagonal regions ahead of the own vehicle 40 in the travelling direction in step S201. Then, the vehicle control apparatus 10 measures the time for which the recognized target object has stayed in a corresponding one of the determination regions in step S202. Next, the vehicle control apparatus 10 determines whether the latest zone-to-zone movement of the recognized target object is directed closer to the travelling course of the own vehicle 40 in step S203.

Upon determining that the latest zone-to-zone movement of the recognized target object is directed closer to the travelling course of the own vehicle 40 (YES in step S203), the vehicle control apparatus 10 determines whether the immediate previous zone-to-zone movement of the recognized target object shows movement closer to the travelling course of the own vehicle 40 in step S204. Upon determining that the immediate previous zone-to-zone movement of the recognized target object shows movement closer to the travelling course of the own vehicle 40 (YES in step S204), the vehicle control apparatus 10 determines whether each of the first and second residence times is equal to or smaller than the corresponding predetermined value in step S205, because the recognized target object has been moving continuously closer to the travelling course of the own vehicle 40.

Specifically, in step S205, the vehicle control apparatus 10 determines whether each of the first residence time of the recognized target object measured from the latest zone-to-zone movement to the present and the second residence time of the recognized target object measured between the immediate previous zone-to-zone movement and the latest movement is smaller than the corresponding predetermined value.

Upon determining that each of the first and second residence times is smaller than the corresponding predetermined value (YES in step S205), the vehicle control apparatus 10 determines that the recognized target object is likely to cross the travelling course of the own vehicle 40. The vehicle control apparatus 10 therefore terminates this subroutine without performing the correction task of the activation region and the activation timing.

Otherwise, upon determining that the latest zone-to-zone movement of the recognized target object is not directed closer to the travelling course of the own vehicle 40 (NO in step S203), the vehicle control apparatus 10 determines that the recognized target object is unlikely to cross the travelling course of the own vehicle 40. The vehicle control apparatus 10 therefore performs the correction task including the reducing task for the activation region and the delaying task for the activation timing in step S206 and thereafter terminates this subroutine.

In addition, upon determining that the latest zone-to-zone movement of the recognized target object is directed closer to the travelling course of the own vehicle 40 (YES in step S203) and that the immediate previous zone-to-zone movement of the recognized target object does not show movement closer to the travelling course of the own vehicle 40 (NO in step S204), the vehicle control apparatus 10 determines that the recognized target object is likely to be travelling in the identical or opposite direction of the own vehicle 40 at a diagonal region ahead of the own vehicle 40. The vehicle control apparatus 10 therefore performs the correction task in step S206 and thereafter terminates this subroutine.

Similarly, if the recognized target object has continuously moved closer to the travelling course of the own vehicle 40 but each of the residence times is equal to or larger than the predetermined value (YES in step S203, YES in step S204, and NO in step S205), the vehicle control apparatus 10 determines that the recognized target object is likely to be travelling in the identical or opposite direction of the own vehicle 40 at a diagonal region in front of the own vehicle 10. The vehicle control apparatus 10 therefore performs the correction task in step S206 and thereafter terminates this subroutine.

Figure 13:
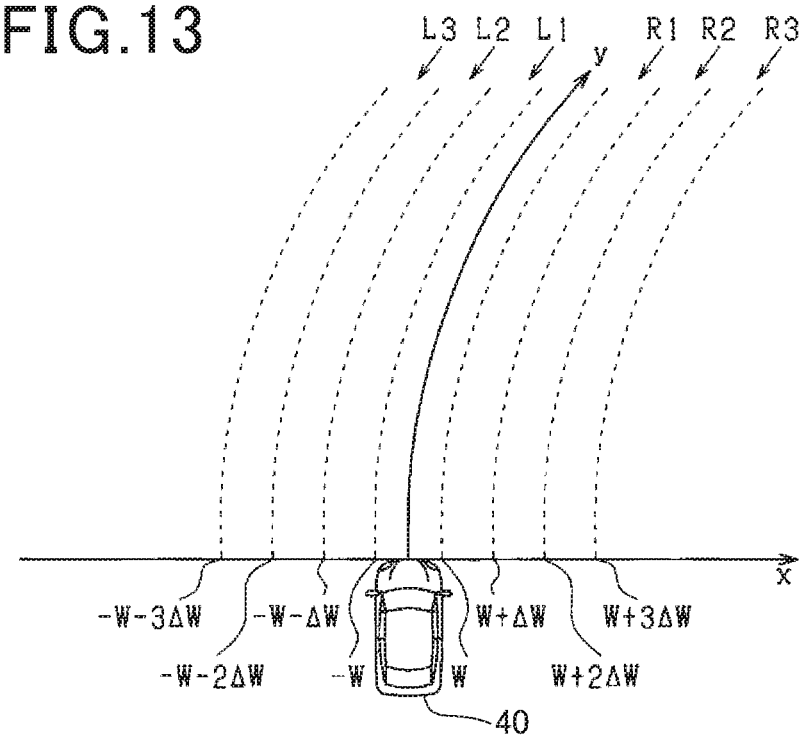
FIG. 13 is a view illustrating how to establish determination zones while an own vehicle is turning according to the first embodiment.

Note that the determination zones are provided parallel with the travelling direction of the own vehicle 40. For this reason, if the own vehicle 40 is travelling on a curved section of a road as illustrated in FIG. 13, the determination zones are defined as zones curved in conformity with the curvature of the curved section.

The above-configured vehicle control apparatus 10 according to the first embodiment achieves the following benefits.

Let us consider a case where a recognized target object is moving to cross across ahead of the own vehicle 40 in the travelling direction. In this case, let us consider that the safety devices 31 and 32 are activated after the recognized target object has entered a region that has a width corresponding to the width of the own vehicle 40 and is located in front of the own vehicle 40. This activation of the safety devices 31 and 32 might result in delay of activation of the safety devices 31 and 32. For this reason, it is necessary to set e width of the activation region to be wider than the width of the own vehicle 40.

On the other hand, if a recognized target object is a two-wheel vehicle, such as a bicycle, which is travelling parallel with the own vehicle 40, the recognized target object is travelling while meandering in the lateral direction. If the meandering behavior of the recognized target object were determined to be the behavior of crossing across in front of the own vehicle 40, unnecessary activation of the safety devices 31 and 32 might be performed.

From these viewpoints, the vehicle control apparatus 10 according to the first embodiment is configured to reduce each of the activation timing and the width of the activation region to be smaller than the corresponding one of the reference values upon determining, based on the determination zones, that a recognized target object is travelling parallel with the own vehicle 40. This configuration therefore enables unnecessary activation of the safety devices 31 and 32 to be reduced.

Laterally divided determination zones provided diagonally in front of the own vehicle 40 in the travelling direction enable the movement-direction tendency of a recognized target object to be obtained based on the movement history of the recognized target object among the determination zones. The residence time of the recognized target object in each of the determination zones in addition to the movement-direction tendency of the recognized target object enables the travelling direction of the recognized target object to be identified.

That is, the vehicle control apparatus 10 according to the first embodiment is configured to perform the correction task based on the movement history and the residence time of a recognized target object; the movement history and the residence time have been obtained based on the determination zones and change of the position of the recognized target object. This configuration enables the width of the activation region and the activation timing to be changed depending on the movement direction of the recognized target object, resulting in reduction of unnecessary activation of the safety devices 31 and 32.

There may be variations in positions of a target object repeatedly detected by, for example, the radar device 21 due to the lateral width of the target object. For this reason, if the rightward end of a target object is detected at a current control period after the leftward end of the target object was detected at the previous control period as an example, it might be determined that the target object is moving in the rightward direction.

From this viewpoint, the vehicle control apparatus 10 according to the first embodiment is configured to identify that a recognized target object is existing in which of the determination zones each having a predetermined lateral width. Even if there may be variations in the detected positions of the recognized target object, this configuration of the vehicle control apparatus 10 reduces determination of continuous movements of the recognized target object among the determination zones while accepting non-continuous movement of the recognized target object between adjacent zones in the determination zones. This configuration therefore enables erroneous determination of movement directions of a recognized target object due to variations in the detected positions of the recognized target object to be reduced, resulting in reduction of unnecessary activation of the safety devices 31 and 32.

Second Embodiment

If a target object is moving away from the travelling course of the own vehicle 40, the probability of collision between the target object and the own vehicle 40 is lower than the probability of collision between the own vehicle 40 and the target object that is travelling parallel with the own vehicle 40.

From this viewpoint, the vehicle control apparatus 10 according to the second embodiment is configured to reduce, based on the determination zones described in the first embodiment, the width of the activation region and the activation timing for the case of a recognized target object moving far away from the travelling course of the own vehicle 40 to be lower than the width of the activation region and the activation timing for the case of the recognized target object moving parallel with the own vehicle 40. Note that the correction task for the case of the recognized target object moving parallel with the own vehicle 40 will be referred to as a first correction task, and the correction task for the recognized target object moving far away from the travelling course of the own vehicle 40 will be referred to as a second correction task.

Figure 14:
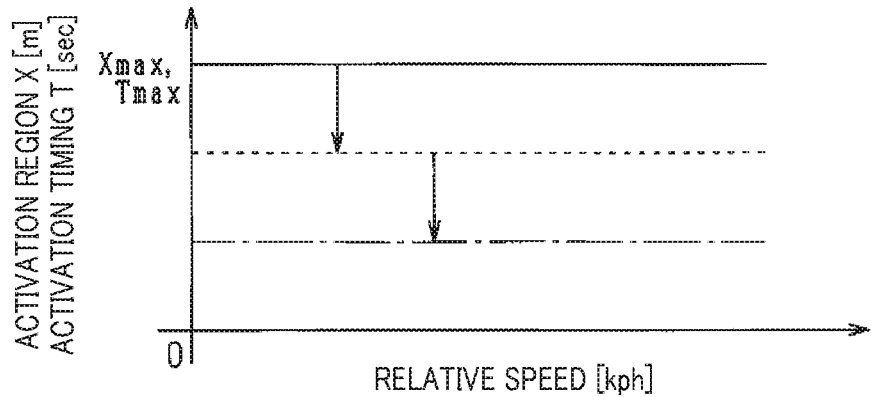
FIG. 14 is a view illustrating an activation region and an activation timing in execution of a correction task according to the second embodiment of the present disclosure.

Like the first embodiment, FIG. 14 shows the width of the activation region and the activation timing if no correction task is carried out (see the solid line in FIG. 14), and FIG. 14 shows a value of the width of the activation region and a value of the activation timing if the first correction task has been carried out (see the dashed line in FIG. 14). Additionally, FIG. 14 shows a value of the width of the activation region and a value of the activation timing if the second correction task has been carried out (see the dot-and-dash line in FIG. 14).

That is, execution of the first correction task results in the width of the activation region and the activation timing being set to be smaller, and execution of the second correction task results in the width of the activation region and the activation timing being set to be further smaller.

Figure 15:
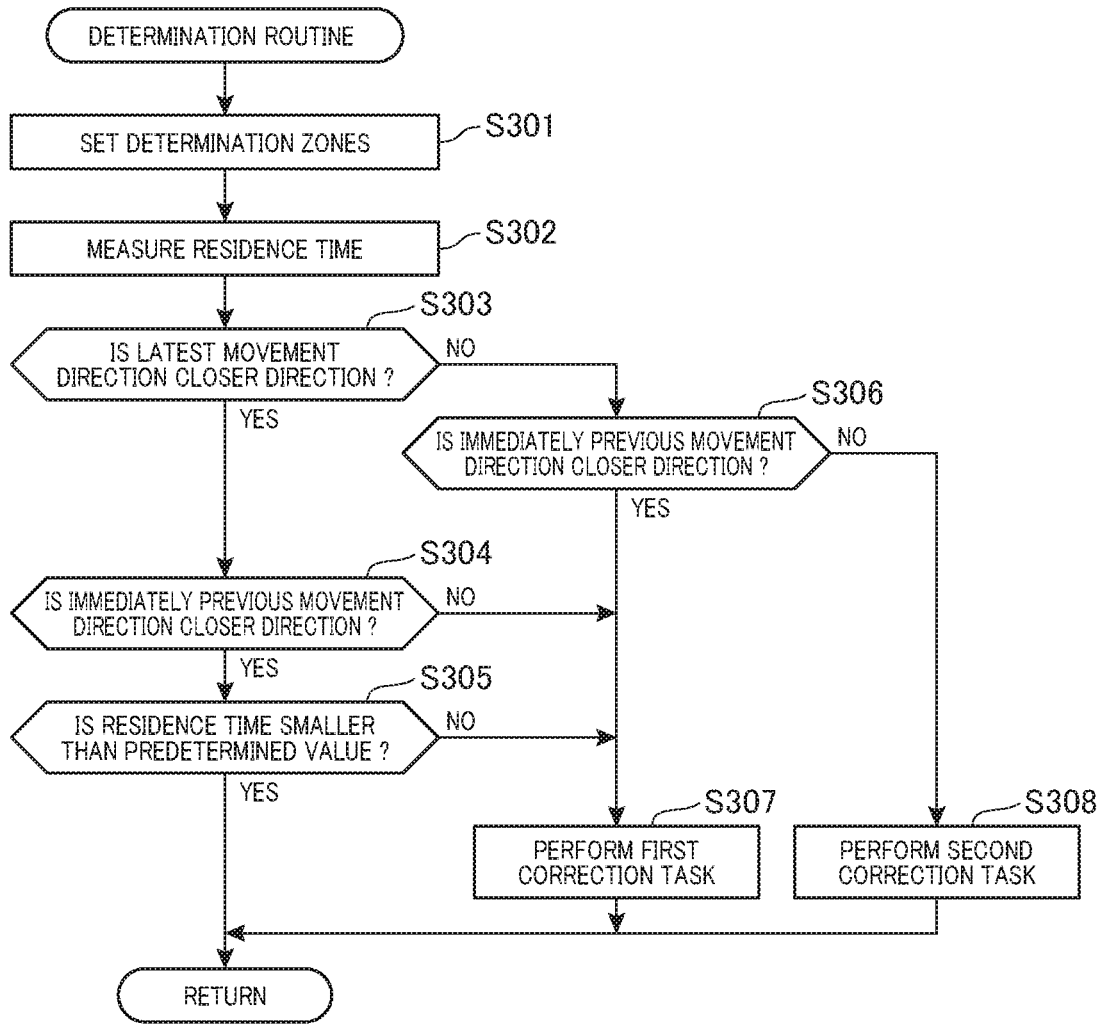
FIG. 15 is a subroutine indicative of a determining routine in the flowchart illustrated in FIG. 11 according the second embodiment.

The sequence of the operations carried out by the vehicle control apparatus 10 according to the second embodiment is similar to that illustrated in FIG. 11 of the first embodiment, but the subroutine in step S107 according to the second embodiment is different from the subroutine in step S107 according to the first embodiment. FIG. 15 illustrates the subroutine of the determining routine in step S107 illustrated in FIG. 11.

First, the vehicle control apparatus 10 sets the determination zones located at diagonal regions in front of the own vehicle 40 in the travelling direction in step S301. Then, the vehicle control apparatus 10 measures time for which the recognized target object has stayed in a corresponding one of the determination regions in step S302. Next, the vehicle control apparatus 10 determines whether the latest zone-to-zone movement of the recognized target object is directed closer to the travelling course of the own vehicle 40 in step S303.

Upon determining that the latest zone-to-zone movement of the recognized target object is directed closer to the travelling course of the own vehicle 40 (YES in step S303), the vehicle control apparatus 10 determines whether the immediate previous zone-to-zone movement of the recognized target object shows movement closer to the travelling course of the own vehicle 40 in step S304. Upon determining that the immediate previous zone-to-zone movement of the recognized target object shows movement closer to the travelling course of the own vehicle 40 (YES in step S304), the vehicle control apparatus 10 determines whether each of the first and second residence times is equal to or smaller than the corresponding predetermined value in step S305, because the recognized target object has performed movement closer to the travelling course of the own vehicle 40.

Upon determining that each of the first and second residence times is smaller than the corresponding predetermined value (YES in step S305), the vehicle control apparatus 10 determines that the recognized target object is likely to cross the travelling course of the own vehicle 40. The vehicle control apparatus 10 therefore terminates this subroutine without performing the correction task of the activation region and the activation timing.

Otherwise, upon determining that the latest zone-to-zone movement of the recognized target object is not directed closer to the travelling course of the own vehicle 40 (NO in step S303), the vehicle control apparatus 10 determines whether the immediate previous zone-to-zone movement of the recognized target object shows movement closer to the travelling course of the own vehicle 40 in step S306. Upon determining that the immediate previous zone-to-zone movement of the recognized target object shows movement closer to the travelling course of the own vehicle 40 (YES in step S306), the vehicle control apparatus 10 determines that the recognized target object has moved to be alternately close to and far from the travelling course of the own vehicle 40, and therefore determines that the recognized target object is likely to be travelling parallel with the own vehicle 40. For this reason, the vehicle control apparatus 10 performs the first correction task in step S307, and thereafter terminates this subroutine.

Similarly, upon determining that the latest zone-to-zone movement of the recognized target object is directed closer to the travelling course of the own vehicle 40 (YES in step S303) and that the immediate previous zone-to-zone movement of the recognized target object does not show movement closer to the travelling course of the own vehicle 40 (NO in step S301), the vehicle control apparatus 10 determines that the recognized target object has moved to be alternately close to and far from the travelling course of the own vehicle 40, and therefore determines that the recognized target object is likely to be travelling parallel with the own vehicle 40. For this reason, the vehicle control apparatus 10 performs the first correction task in step S307, and thereafter terminates this subroutine.

Upon determining that the latest zone-to-zone movement of the recognized target object is not directed closer to the travelling course of the own vehicle 40 (NO in step S303) and that the immediate previous zone-to-zone movement of the recognized target object does not show movement closer to the travelling course of the own vehicle 40 (NO in step S306), the vehicle control apparatus 10 determines that the recognized target object is likely to be moving far away from the travelling course of the own vehicle 40. The vehicle control apparatus 10 therefore performs the second correction task in step S308 and thereafter terminates this subroutine.

Note that, even if the recognized target object has been continuously moving away from the travelling course of the own vehicle 40, the vehicle control apparatus 10 can perform, which is similar to the case of the recognized object having been continuously moving closer to the travelling course of the own vehicle 40, (1) The second correction task upon each of the first and second residence times being smaller than the corresponding predetermined value (2) The first correction task upon each of the first and second residence times being equal to or larger than the corresponding predetermined value The above-configured vehicle control apparatus 10 according to the second embodiment achieves the following benefits.

If a recognized target object has a behavior of separating from the own vehicle 40, there is a low necessity of activating the safety devices 31 and 32 for the recognized target object. The vehicle control apparatus 10 according to the second embodiment is configured to determine, based on the determination zones, whether a recognized target object has been moving away from the own vehicle 40, and perform the second correction task to further reduce the activation region and further delay the activation timing upon the recognized target object has been moved to be far away from the own vehicle 40. This configuration more reliably prevents unnecessary activation of the safety devices 31 and 32 for a recognized target object moving away from the own vehicle 40.

Third Embodiment

Figure 16:
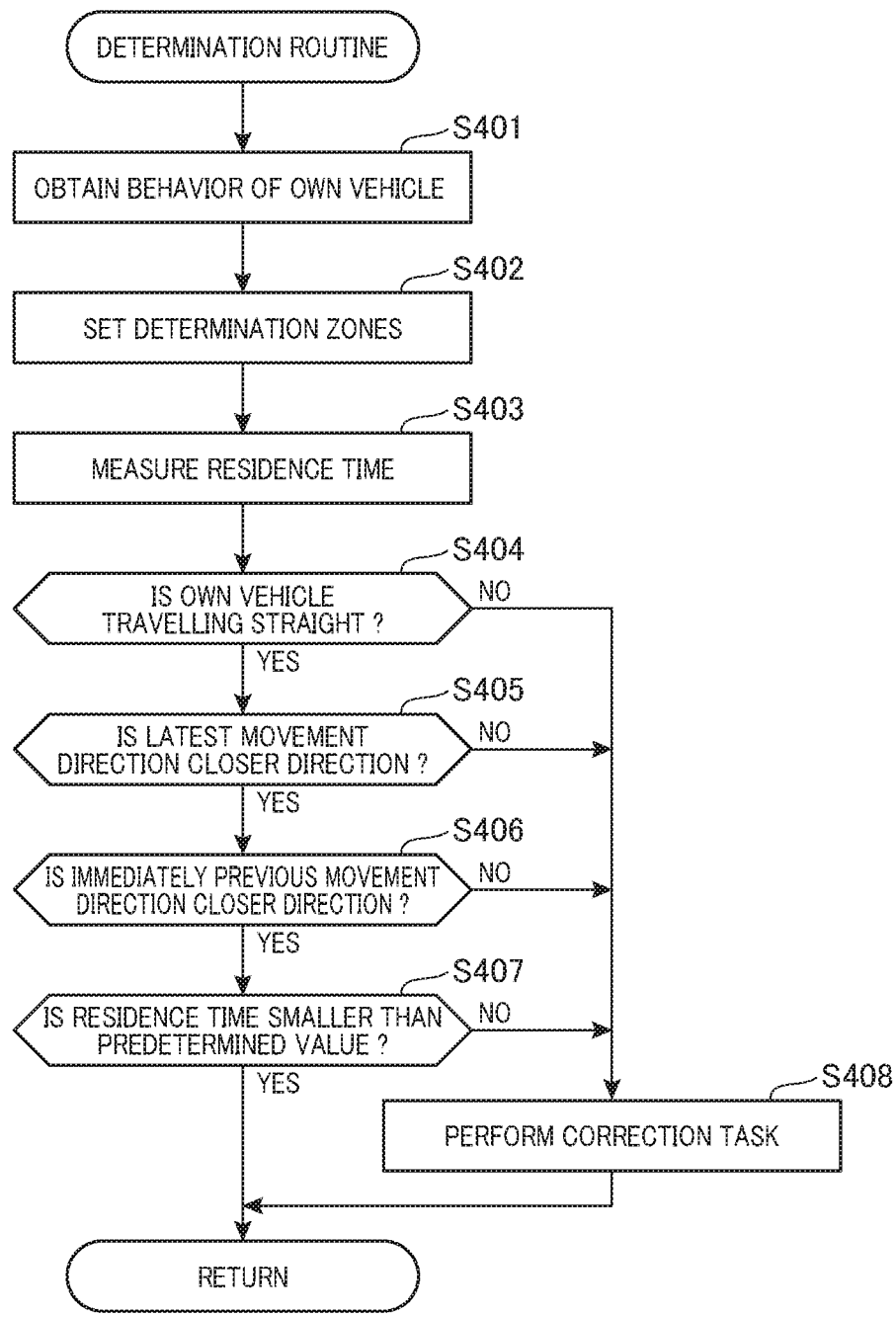
FIG. 16 is a subroutine indicative of a determining routine in the flowchart illustrated in FIG. 11 according to the third embodiment.

The sequence of the operations carried out by the vehicle control apparatus 10 according to the third embodiment is similar to that illustrated in FIG. 11 of the first embodiment, but the subroutine in step S107 according to the third embodiment is different from the subroutine in step S107 according to the first embodiment. FIG. 16 illustrates the subroutine of the determining routine in step S107 illustrated in FIG. 11.

First, the vehicle control apparatus 10 obtains the behavior of the own vehicle 40 in step S401, and sets the determination zones located at diagonal regions in front of the own vehicle 40 in the travelling direction in step S402. Then, the vehicle control apparatus 10 measures time for which the recognized target object has stayed in a corresponding one of the determination regions in step S403.

Next, the vehicle control apparatus 10 determines, based on the behavior of the own vehicle 40, whether the own vehicle 40 is travelling straight in step S404.

Upon determining that the own vehicle 40 is travelling straight (YES in step S404), the vehicle control apparatus 10 determines whether the latest zone-to-zone movement of the recognized target object is directed closer to the travelling course of the own vehicle 40 in step S405.

Upon determining that the latest zone-to-zone movement of the recognized target object is directed closer to the travelling course of the own vehicle 40 (YES in step S405), the vehicle control apparatus 10 determines whether the immediate previous zone-to-zone movement of the recognized target object shows movement closer to the travelling course of the own vehicle 40 in step S406.

Upon determining that the immediate previous zone-to-zone movement of the recognized target object shows movement closer to the travelling course of the own vehicle 40 (YES in step S406), the vehicle control apparatus 10 determines whether each of the first and second residence times is equal to or smaller than the corresponding predetermined value in step S407, because the recognized target object has been moving continuously closer to the travelling course of the own vehicle 40.

Upon determining that each of the first and second residence times is smaller than the corresponding predetermined value (YES in step S407), the vehicle control apparatus 10 determines that the recognized target object is likely to cross the travelling course of the own vehicle 40. The vehicle control apparatus 10 therefore terminates this subroutine without performing the correction task of the activation region and the activation timing.

Otherwise, upon determining that the own vehicle 40 is not travelling straight (NO in step S404), the vehicle control apparatus 10 determines that it is difficult to distinguish the crossing movement of the recognized target object and the parallel travelling of the recognized target object from each other. Then, the vehicle control apparatus 10 performs the correction task including the reducing task for the activation region and the delaying task for the activation timing in step S408 to thereby reduce unnecessary activation of the safety devices and thereafter terminates this subroutine.

Upon determining that the own vehicle 40 is travelling straight (YES in step S404) and that the latest zone-to-zone movement of the recognized target object is not directed closer to the travelling course of the own vehicle 40 (NO in step S405), the vehicle control apparatus 10 determines that the recognized target object is unlikely to cross the travelling course of the own vehicle 40. The vehicle control apparatus 10 therefore performs the correction task in step S408 and thereafter terminates this subroutine.

If the latest zone-to-zone movement of the recognized target object is directed closer to the travelling course of the own vehicle IC) (YES in step S405) and the immediate previous zone-to-zone movement of the recognized target object does not show movement closer to the travelling course of the own vehicle 40 (NO in step S406), the vehicle control apparatus 10 determines that the recognized target object is likely to be travelling in the identical or opposite direction of the own vehicle 40 at a diagonal region in front of the own vehicle 40. The vehicle control apparatus 10 therefore performs the correction task in step S408 and thereafter terminates this subroutine.

Similarly, if the recognized target object has continuously moved closer to the travelling course of the own vehicle 40 and each of the first and second residence times is larger than the corresponding predetermined value (YES in step S405, YES in step S406, and NO in step S407), the vehicle control apparatus 10 determines that the recognized target object is likely to be travelling in the identical or opposite direction of the own vehicle 40 at a diagonal region in front of the own vehicle 40. The vehicle control apparatus 10 therefore performs the correction task in step S408 and thereafter terminates this subroutine.

The above configuration of the vehicle control apparatus 10 according to the third embodiment enables unnecessary activation of the safety devices 31 and 32 to be reduced if it is difficult to distinguish crossing movement and parallel travelling of a recognized target object from each other.

Fourth Embodiment

If a driver has recognized the existence of a target object and has performed operations to avoid collision of the own vehicle 40 with the recognized target object, activation of the safety devices 31 and 32 in addition to the driver's avoidance operations might be determined as activation against the driver's will, i.e. unnecessary activation of the safety devices 31 and 32.

From this viewpoint, the corrector 15 according to the fourth embodiment is configured to determine whether a driver's operation to avoid collision with a recognized target object has been performed, and perform the correction task for the activation region and the activation timing upon determining that the driver's operation to avoid collision with a recognized target object has been performed.

Figure 17:
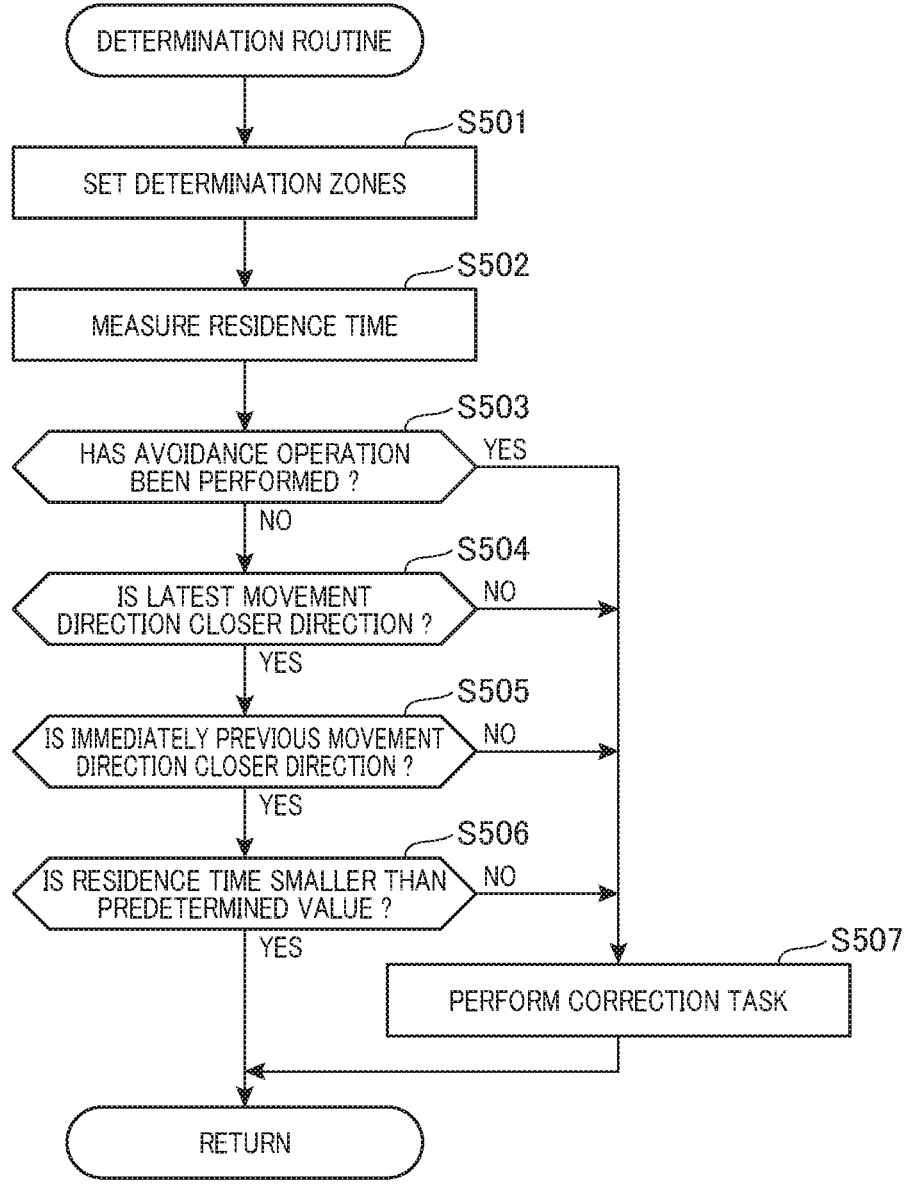
FIG. 17 is a subroutine indicative of a determining routine in the flowchart illustrated in FIG. 11 according to the fourth embodiment.

The sequence of the operations carried out by the vehicle control apparatus 10 according to the third embodiment is similar to that illustrated in FIG. 11 of the first embodiment, but the subroutine in step S107 according to the third embodiment is different from the subroutine in step S107 according to the first embodiment. FIG. 17 illustrates the subroutine of the determining routine in step S107 illustrated in FIG. 11.

First, the vehicle control apparatus 10 sets the determination zones located at diagonal regions in front of the own vehicle 40 in the travelling direction in step S501. Then, the vehicle control apparatus 10 measures time for which the recognized target object has stayed in a corresponding one of the determination regions in step S502.

Next, the vehicle control apparatus 10 determines whether a driver's operation to avoid collision with the recognized target object has been performed in step S503.

Upon determining that no driver's operations to avoid collision with the recognized target object have been performed (NO in step S503), the vehicle control apparatus 10 determines whether the latest zone-to-zone movement of the recognized target object is directed closer to the travelling course of the own vehicle 40 in step S504.

Upon determining that the latest zone-to-zone movement of the recognized target object is directed closer to the travelling course of the own vehicle 40 (YES in step S504), the vehicle control apparatus 10 determines whether the immediate previous zone-to-zone movement of the recognized target object shows movement closer to the travelling course of the own vehicle 40 in step S505.

Upon determining that the immediate previous zone-to-zone movement of the recognized target object shows movement closer to the travelling course of the own vehicle 40 (YES in step S505), the vehicle control apparatus 10 determines whether each of the first and second residence tunes is equal to or smaller than the corresponding predetermined value in step S506, because the recognized target object has been moving continuously closer to the travelling course of the own vehicle 40.

Upon determining that each of the first and second residence times is smaller than the corresponding predetermined value (YES in step S506), the vehicle control apparatus 10 determines that the recognized target object is likely to cross the travelling course of the own vehicle 40. The vehicle control apparatus 10 therefore terminates this subroutine without performing the correction task of the activation region and the activation timing.

Otherwise, upon determining that a driver's operation to avoid collision with the recognized target object has been performed (YES in step S503), the vehicle control apparatus 10 determines that it is difficult to distinguish the crossing movement of the recognized target object and the parallel travelling of the recognized target object from each other. Then, the vehicle control apparatus 10 performs the correction task including the reducing task for the activation region and the delaying task for the activation timing in step S507 to thereby reduce unnecessary activation of the safety devices and thereafter terminates this subroutine.

Upon determining that no driver's operations to avoid collision with the recognized target object have been performed and that the latest zone-to-zone movement of the recognized target object is not directed closer to the travelling course of the own vehicle 40 (NO in step S504), the vehicle control apparatus 10 determines that the recognized target object is unlikely to cross the travelling course of the own vehicle 40. The vehicle control apparatus 10 therefore performs the correction task in step S507 and thereafter terminates this subroutine.

If the latest zone-to-zone movement of the recognized target object is directed closer to the travelling course of the own vehicle 40 (YES in step S504) and the immediate previous zone-to-zone movement of the recognized target object does not show movement closer to the travelling course of the own vehicle 40 (NO in step S505), the vehicle control apparatus 10 determines that the recognized target object is likely to be travelling in the identical or opposite direction of the own vehicle 40 at a diagonal region in front of the own vehicle 40. The vehicle control apparatus 10 therefore performs the correction task in step S507 and thereafter terminates this subroutine.

Similarly, if the recognized target object has continuously moved closer to the travelling course of the own vehicle 40 and each of the first and second residence times is larger than the corresponding predetermined value (YES in step S504, YES in step S505, and NO in step S5061, the vehicle control apparatus 10 determines that the recognized target object is likely to be travelling in the identical or opposite direction of the own vehicle 40 at a diagonal region in front of the own vehicle 40. The vehicle control apparatus 10 therefore performs the correction task in step S507 and thereafter terminates this subroutine.

The above configuration of the vehicle control apparatus 10 according to the fourth embodiment enables activation of the safety devices 31 and 32 against the driver's intention of collision avoidance to be reduced.

Modifications

In each embodiment, the correction task is configured to correct both the activation region and the activating timing, but can be configured to correct one of the activation region and the activating timing. This modification also enables unnecessary activation of the safety devices 31 and 32 to be reduced.

The widths of the determination zones are set to be equal to one another, but can be set to be different from one another. Because there are greater variations in the positions of a recognized target object detected by the radar device 21 as the recognized target object is farther from the own vehicle 40. From this viewpoint, the widths of the determination zones can be set to be wider as the positions of the determination zones are farther from the own vehicle 40. This configuration prevents frequent detections of zone-to-zone movements among the zones located far away from the own vehicle 40.

The determination zones according to each embodiment are located to be parallel with the travelling direction of the own vehicle 40, but the widths of the determination zones can be wider as the determination zones are farther from the own vehicle 40.

Three determination zones and three determination zones are provided in the respective left and right directions of the own vehicle 40, but four or more determination zones and four or more determination zones can be provided in the respective left and right directions of the own vehicle 40. This modification can be configured to determine that a recognized target object has been continuously moving closer to the travelling course of the own vehicle 40 if it is determined that the recognized target object has been moving in the direction close to the travelling course of the own vehicle 40 three times or more.

The longer a recognized target object exists in a zone in the determination zones, the higher the possibility of the recognized target object travelling parallel with the own vehicle 40. For this reason, it is possible to change a correction quantity used by the correction task.

Each embodiment is configured to (1) Set the width of the activation region and the activation timing to the corresponding one of the predetermined values upon a recognized target object being determined to perform the crossing movement (2) Set the width of the activation region and the activation timing to be smaller than the corresponding one of the predetermined values upon a recognized target object being determined to be travelling parallel with the own vehicle 40

In contrast to this configuration, each embodiment can be configured to (1) Set the width of the activation region and the activation timing to the corresponding one of the predetermined values upon a recognized target object being determined to be travelling parallel with the own vehicle 40

(2) Set the width of the activation region and the activation timing to be larger than the corresponding one of the predetermined values upon a recognized target object being determined to perform the crossing movement Each embodiment is configured to determine the tendency of movement of a recognized target object using the residence times of the recognized target object, but can be configured to determine the tendency of movement of a recognized target object using zone-to-zone movements of the recognized target object.

Two-wheel vehicles, such as bicycles, are likely to travel in the identical or opposite direction of the own vehicle 40 at a diagonal region in front of the own vehicle 40. In contrast, vehicles having four or more wheels or pedestrians are unlikely to travel in the identical or opposite direction of the own vehicle 40 at a diagonal region in front of the own vehicle 40. For this reason, the determination zone setter 17 can be configured to set the determination zones for only a two-wheel vehicle as a recognized target object, and the corrector 15 can be configured to perform the correction task for only a two-wheel vehicle as a recognized target object.

In each embodiment, the vehicle in which the vehicle control apparatus 10 is installed is configured as a driver-driven vehicle. The vehicle control apparatus 10 can be installed in an autonomous vehicle.

The functions of the safety devices according to each embodiment include the warning function, brake-assist function, and automatic brake function, but cannot be limited to these functions. Specifically, the functions of the safety devices according to each embodiment can include a function of steering the corresponding vehicle to a direction that can avoid a collision with the recognized target object.

This application is based on and claims the benefit of priority from. Japanese Patent Application 2015-203113, the disclosure of which is incorporated in its entirety herein by reference.

REFERENCE SIGNS LIST

10 . . . Vehicle control apparatus 12 . . . Collision time calculator
13 . . . Activation region setter 14 . . . Activation timing setter
15 . . . Corrector 16 . . . Activation determiner
17 . . . Determination zone setter 18 . . . Timer
19 . . . Determiner

The invention claimed is:

1. A vehicle control apparatus for recognizing a target object existing in front of an own vehicle in a travelling direction of the own vehicle, and for activating, based on a possibility of the recognized target object colliding with the own vehicle, a device as a safety device for avoiding a collision or mitigating damage from a collision, the vehicle control apparatus comprising:
a collision time calculator configured to calculate a collision prediction time that is a prediction time taken until which the own vehicle is predicted to collide with the recognized target object;
an activation region setter configured to set an activation region ahead of the travelling direction of the own vehicle, the activation region having a predetermined width in a direction perpendicular to a travelling course of the own vehicle;
a timing setter configured to set an activation timing indicative of whether to activate the safety device based on a comparison between the activation timing and the collision prediction time;
a determination zone setter configured to set determination zones located diagonally in front of the own vehicle in the travelling direction and separated in a lateral direction;
a corrector configured to perform, based on a zone-to-zone movement history of the recognized target object among the determination zones, a correction task that includes at least one of:
a first changing task of changing the width of the activation region; and
a second changing task of changing the activation timing; and
an activation determiner configured to activate the safety device upon determining that a position of the recognized target object is within the activation region and that the collision prediction time is smaller than the activation timing.

2. The vehicle control apparatus according to claim 1, wherein:
the corrector is configured to cause at least one of the width of the activation region and the activation timing upon the recognized target object not moving closer to the travelling course of the own vehicle to be smaller than the corresponding at least one of the width of the activation region and the activation timing upon the recognized target object moving closer the travelling course of the own vehicle.

3. The vehicle control apparatus according to claim 1, wherein:
the activation region setter is configured to set the width of the activation region based on a predetermined reference value;
the timing setter is configured to set the activation timing based on a predetermined reference value; and
the corrector is configured to cause at least one of the width of the activation region and the activation timing to be smaller than the corresponding one of the reference values if the movement history of the recognized target object does not show movement of the recognized target object closer to the travelling course of the own vehicle.

4. The vehicle control apparatus according to claim 2, wherein:
the corrector is configured to cause at least one of the width of the activation region and the activation timing upon the recognized target object moving away from the travelling course of the own vehicle to be smaller than the corresponding at least one of the width of the activation region and the activation timing upon the recognized target object not moving away from the travelling course of the own vehicle.

5. The vehicle control apparatus according to claim 2, further comprising:
a timer configured to measure residence time for which the recognized target object has continuously stayed in any one of the determination zones,
wherein the corrector is configured to determine that the recognized target object is likely to move closer to the travelling course of the own vehicle to correspondingly not perform the correction task upon:
the recognized target object having performed movement, among zones in the determination zones, closer to the travelling course of the own vehicle a predetermined number of times; and
the residence time measured during the movement being lower than a predetermined value.

6. The vehicle control apparatus according to claim 2, further comprising:
a timer configured to measure residence time for which the recognized target object has continuously stayed in any one of the determination zones,
wherein the corrector is configured to determine that the recognized target object is unlikely to move closer to the travelling course of the own vehicle to correspondingly perform the correction task upon the residence time measured during the movement being higher than a predetermined value.

7. The vehicle control apparatus according to claim 1, wherein:
the determination zones are located parallel with the travelling direction of the own vehicle.

8. The vehicle control apparatus according to claim 1, wherein:
the corrector is configured to perform the correction task independently of the zone-to-zone movement history of the recognized target object upon the own vehicle being not travelling straight.

9. The vehicle control apparatus according to claim 1, wherein:
the corrector is configured to:
determine whether a driver of the own vehicle has performed an operation to avoid a collision; and
perform the correction task independently of the zone-to-zone movement history of the recognized target object upon determining that the driver of the own vehicle has performed the operation to avoid a collision.

10. The vehicle control apparatus according to claim 1, wherein:
the determination zone setter is configured to set the determination zones upon the target object being a two-wheel vehicle; and
the corrector is configured to perform the correction task upon the target object being the two-wheel vehicle.

11. A vehicle control method to be carried out by a vehicle control apparatus for recognizing a target object existing in front of an own vehicle in a travelling direction of the own vehicle, and for activating, based on a possibility of the recognized target object colliding with the own vehicle, a device as a safety device for avoiding a collision or mitigating damage from a collision, the vehicle control method comprising:
a collision time calculating step of calculating a collision prediction time that is a prediction time until which the own vehicle is predicted to collide with the recognized target object;
an activation region setting step of setting an activation region ahead of the travelling direction of the own vehicle, the activation region having a predetermined width in a direction perpendicular to a travelling course of the own vehicle;
a timing setting step of setting an activation timing indicative of whether to activate the safety device based on a comparison between the activation timing and the collision prediction time;
a determination zone setting step of setting determination zones located diagonally in front of the own vehicle in the travelling direction and separated in a lateral direction;
a correcting step of performing, based on a zone-to-zone movement history of the recognized target object among the determination zones, a correction task that includes at least one of:
a first changing task of changing the width of the activation region; and
a second changing task of changing the activation timing; and
an activation determining step of activating the safety device upon determining that a position of the recognized target object is within the activation region and that the collision prediction time is smaller than the activation timing.

* * * * *